US008805421B2

United States Patent
Udani

(10) Patent No.: US 8,805,421 B2
(45) Date of Patent: Aug. 12, 2014

(54) METHOD AND SYSTEM FOR SENDING RING SETTING REMINDERS TO MOBILE DEVICES WITHIN A PREDETERMINED AREA

(71) Applicant: Verizon Services Corp., Arlington, VA (US)

(72) Inventor: Sanjay Kumar Udani, Arlington, VA (US)

(73) Assignee: Verizon Services Corp., Ashburn, VA (US)

( * ) Notice: Subject to any disclaimer, the term of this patent is extended or adjusted under 35 U.S.C. 154(b) by 0 days.

(21) Appl. No.: 13/888,867

(22) Filed: May 7, 2013

(65) Prior Publication Data

US 2013/0244707 A1 Sep. 19, 2013

Related U.S. Application Data

(63) Continuation of application No. 11/563,480, filed on Nov. 27, 2006, now Pat. No. 8,452,309.

(51) Int. Cl.
*H04W 24/00* (2009.01)

(52) U.S. Cl.
USPC .................. 455/456.4; 455/456.1; 455/404.2; 455/194.1; 455/422.1

(58) Field of Classification Search
USPC ............. 455/456.1–456.6, 418, 422.1, 194.1, 455/404.1
See application file for complete search history.

(56) References Cited

U.S. PATENT DOCUMENTS

| | | | |
|---|---|---|---|
| 6,011,973 A | 1/2000 | Valentine et al. | |
| 6,212,390 B1 | 4/2001 | Rune | |
| 6,438,385 B1 | 8/2002 | Heinonen et al. | |
| 6,625,455 B1 | 9/2003 | Ariga | |
| 6,832,093 B1 * | 12/2004 | Ranta | 455/456.4 |
| 7,069,027 B2 * | 6/2006 | Miriyala | 455/456.4 |
| 7,194,278 B1 | 3/2007 | Cook | |
| 7,437,168 B1 | 10/2008 | Westfield | |
| 2002/0077118 A1 | 6/2002 | Zellner et al. | |
| 2002/0167444 A1 | 11/2002 | Lee | |
| 2004/0192311 A1 * | 9/2004 | Koskinen et al. | 455/440 |
| 2005/0070247 A1 | 3/2005 | Larson et al. | |
| 2008/0113657 A1 | 5/2008 | Abu-Amara et al. | |

* cited by examiner

*Primary Examiner* — Ajit Patel

(57) ABSTRACT

A method and a system for sending a ring setting reminder to one or more mobile devices within a predetermined area are provided. The ring setting reminder may be a reminder signal sent to cell phones and other mobile devices within a movie theater complex or other predetermined area to remind the users of the mobile devices to silence the ringers of the mobile devices before the start of the movie or other event. The identification of the mobile devices may occur at the predetermined area or through a wireless communication network. The wireless communication network may be configured to identify the predetermined area within the wireless communication network, identify one or more of the mobile devices located within the predetermined area, and send the reminder signal to correspond with the start of an event at the predetermined area.

18 Claims, 5 Drawing Sheets

US 8,805,421 B2

METHOD AND SYSTEM FOR SENDING RING SETTING REMINDERS TO MOBILE DEVICES WITHIN A PREDETERMINED AREA

CROSS-REFERENCE TO RELATED APPLICATIONS

This patent application is a continuation of and claims priority to U.S. patent application Ser. No. 11/563,480, filed Nov. 27, 2006. The contents of this priority application is hereby incorporated by reference herein in its entirety.

BACKGROUND INFORMATION

Some patrons forget to turn off the ringers or set the ringers to a silent setting on their mobile devices, such as cell phones, personal digital assistants, and pagers, when watching a play, a movie, or other public performance. Therefore, the ringers on mobile devices sometimes go off during the performance, which may annoy or distract the other patrons and embarrass the owners of the mobile devices.

Many theaters and other venues make announcements to remind patrons to turn down or turn off the ringers on their mobile devices. However, even with the announcements, it is inevitable that some of the patrons still forget to do so.

It may be possible to install a cell phone blocking device or system that could suppress the operation of all the mobile devices, such that the ringers, including ones set to a silent setting, would not operate and thus would not go off during the performance. Cell phone blocking devices have been used in very limited areas but have been banned in other areas. A concern with such technologies is the inability to filter or screen certain calls or messages to the mobile devices. For example, the use of blocking devices prevents emergency calls from getting though to the intended mobile device; even if the ringer on the mobile device is set in a silent setting, such as vibrate. Therefore, blocking devices may alienate the patrons or even raise potential safety and legal concerns.

BRIEF DESCRIPTION OF THE SEVERAL VIEWS OF THE DRAWING(S)

DETAILED DESCRIPTION OF PREFERRED EMBODIMENTS

Exemplary embodiments are described hereinafter with reference to the accompanying drawings, in which exemplary embodiments and examples are shown. Like numbers refer to like elements throughout.

Exemplary embodiments of the present invention relate to methods and systems for sending a signal to one or more mobile devices within a predetermined area. Although a mobile device is primarily described herein as a cellular phone, a mobile device may also be a personal digital assistant ("PDA"), a pager, or any other personal communication system ("PCS"). The predetermined area may be one or more buildings, one or more portions of a building, an outside area, or a combination of an outside area and at least a portion of a building. For example, the predetermined area may be a single screen area of a movie theater complex, the entire movie theater complex, a concert hall, an arena, a stadium, or any other venue for hosting a performance or event. The signal is specifically directed to the users of the mobile devices within the predetermined area to remind those users to change the ring setting on the mobile devices before the start of an event associated with the predetermined area.

Figure 1:
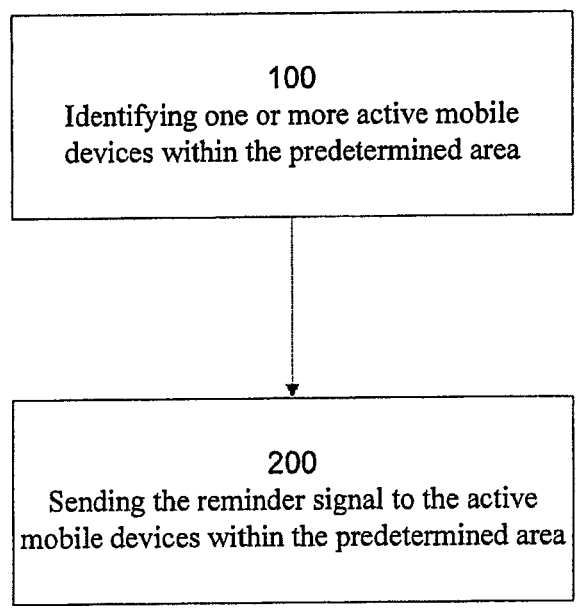
FIG. 1 illustrates a flow chart of a method according to an exemplary embodiment.

According to the embodiment illustrated in FIG. 1, a method for sending a ring setting reminder, referred to as a "reminder signal," to one or more mobile devices within a predetermined area is provided. The method may include identifying the mobile devices that are active within a predetermined area 100 and sending a reminder signal to one or more active mobile devices within the predetermined area 200. In general, a mobile device is configured to receive one or more signals, such as a telephone call, a page, an instant message, a text message, or an email message, from one or more external sources. The mobile device is considered "active" if it is ready, i.e., enabled or configured, to receive one or more signals. The mobile device includes a ringer element that is configured to alert the user of the mobile device of an incoming or received signal. More specifically, the ringer element may have different ring settings for selecting between a variety of audio indicators such as ring tones, non-audio indicators such as a vibrating mode, or a combination thereof. The ring settings may also include selecting between different volume settings for the audio indicators. The reminder signal or signals sent to each of the mobile devices within the predetermined area may be configured to activate the ringer element on the mobile device to help remind the user of the mobile device of the current ring setting for his or her mobile device. Beyond activating the ringer element, the reminder signal may also include a message to notify the user for the purpose of the signal. For example, according to some embodiments of the present invention, the reminder signal could be an incoming telephone call that includes a pre-recorded message to please change the ring setting in the mobile device to a non-audio indicator. Or the reminder signal could be an instant or text message providing such a reminder message.

The operation of determining the number and identity of the active mobile devices within the predetermined area may vary between the various embodiments. For example, the identity of the mobile devices may be determined at the predetermined area. In some embodiments, the predetermined area may be a venue for an event that requires a ticket for entrance into the venue. As part of the ticket purchase, the patron may provide the number to his or her mobile device and the organizer of the event may gather the numbers for all the patrons into a list and use the list as the basis for identifying the mobile devices within the predetermined area. The list may be updated before the event by reviewing the tickets that were actually used to enter into the venue. For the tickets that were purchased but were not used before the event, the organizer may assume that the patrons for the unused tickets are not within the venue and thus their mobile devices may be removed from the list. In some embodiments, the mobile devices may be tagged with electronic surveillance devices, such as a RFID chip, that is detectable at the entrances of the venue. Therefore, as a patron enters the venue with the mobile device, the mobile device may be detected and added to the list of mobile devices within the predetermined area. The RFID chip may contain information such as the access number of the mobile device which may be used to send the reminder signal to the mobile device.

Figure 2:
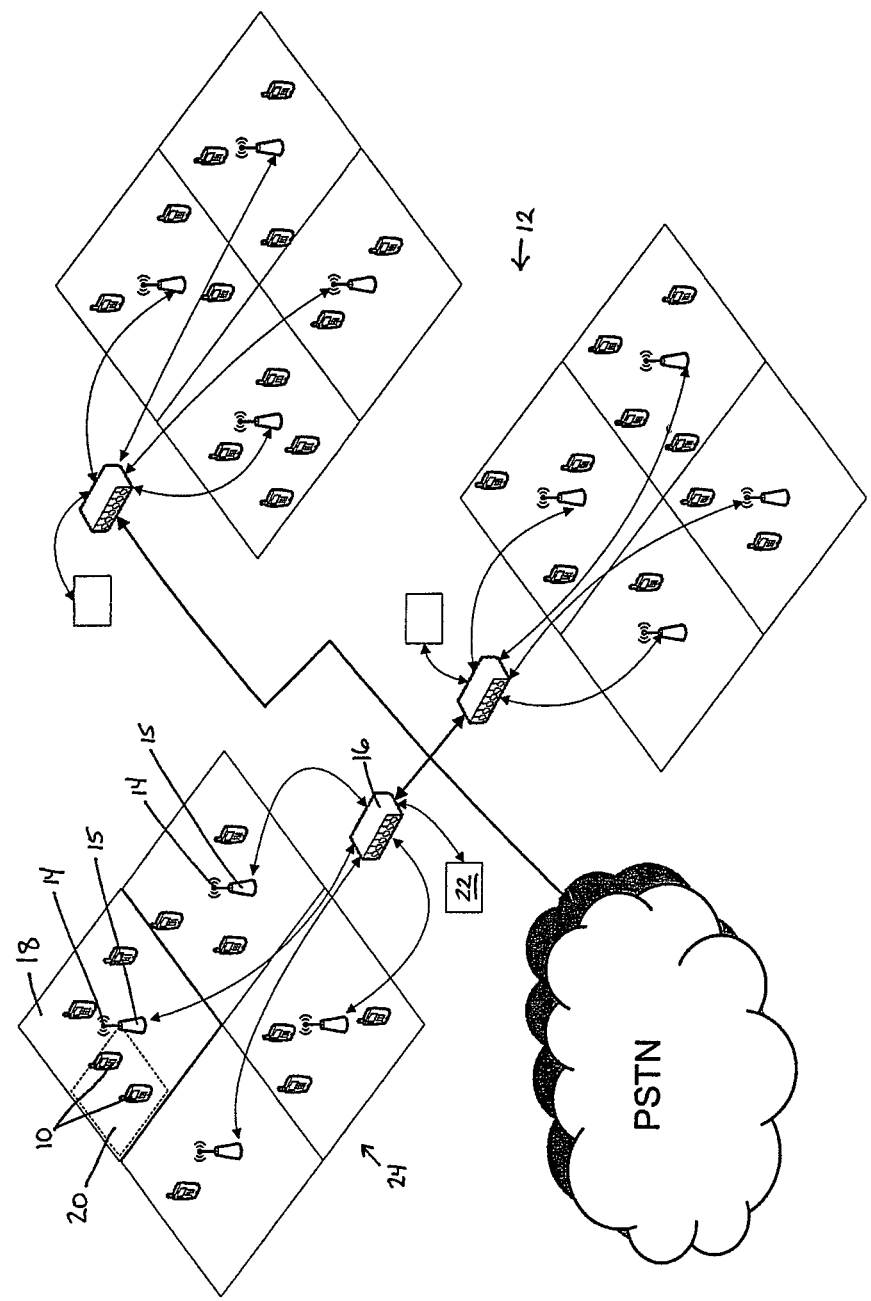
FIG. 2 illustrates a block diagram of a wireless communication network according to an exemplary embodiment.

Alternatively, the identity of the mobile devices may be determined through the wireless communication network of the mobile devices. For example and as illustrated in FIG. 2, the mobile devices 10 located in the predetermined area 20 may operate within a wireless communication network 12. The wireless communication network 12 may include a plurality of transceiver elements 14, one or more controller elements 15, and one or more switching elements 16. Each transceiver element 14 is configured to receive and transmit signals from and to mobile devices 10 within a certain radius or range of the transceiver element 14, referred to as the coverage area 18 of the transceiver element. A switching element 16 is configured to route signals to and from a plurality of transceiver elements 14 and, in some instances, other switching elements and/or other communication networks, such as the public switching telephone network ("PSTN") or the Internet. One exemplary switching element may also be referred to as a mobile switching center ("MSC") or a mobile telephone switching office ("MTSO"). The wireless communication network may include a controller or processing element 15 for each transceiver element 16 as illustrated in FIG. 2. Moreover, as illustrated, each pair of transceiver element 16 and controller element 15 may be integrated as a transceiver controller apparatus, also referred to as a base station. However in other embodiments, the controller element may be separated from the transceiver element and more specifically, one controller element may be operable with more than one transceiver element. The one or more controller elements 15 of the wireless communication network may facilitate through the one or more switching elements 16 the transfer or hand-off between transceiver elements 16 when a mobile device moves from a coverage area of a first transceiver element to a coverage area of the second transceiver element.

The wireless communication network 12 may further include at least one storage element 22 for storing information pertaining to the mobile devices operating within the wireless communication network. For example, a storage element 22 may contain a visitor location register ("VLR") for each switching element 16. In particular and as illustrated in FIG. 2, a switching element 16 may be in direct communication with a set of transceiver elements 14 such that the switching element 16 provides a communication conduit between the transceiver elements 14 in direct communication with the switching element 16 and other switching elements and/or other communication networks. The VLR may be a database of information about each mobile device within the coverage areas 18 of the transceiver elements in direct communicate with the switching element, collectively referred to as the coverage area 24 of the switching element. The VLR identifies the one or more mobile devices within the coverage area 24 of the switching element. Therefore, the stored information of the VLR allows the wireless communication network 12 to determine the location of a particular mobile device by switching element coverage, which may be used by the wireless communication network to route or direct signals through the appropriate switching element to and from the mobile device. The information stored in the VLR is updated as mobile devices 10 enter and leave the coverage area 24 of the switching element or are deactivated or activated within the coverage area 24 of the switching element.

A portion of the stored information within the VLR may be a local area identity "LAI" for each mobile device 10 within the coverage area 24 of the switching element. The LAI identifies the particular transceiver element 14 in direct communications with the switching element 16 in which the mobile device 10 is currently located. The LAI is updated as the mobile device 10 moves between the coverage areas 18 of the transceiver elements or leaves the coverage area 24 of the transceiver element or is deactivated or activated within the coverage area 18 of a transceiver element in direct communications with the switching element.

Figure 3:
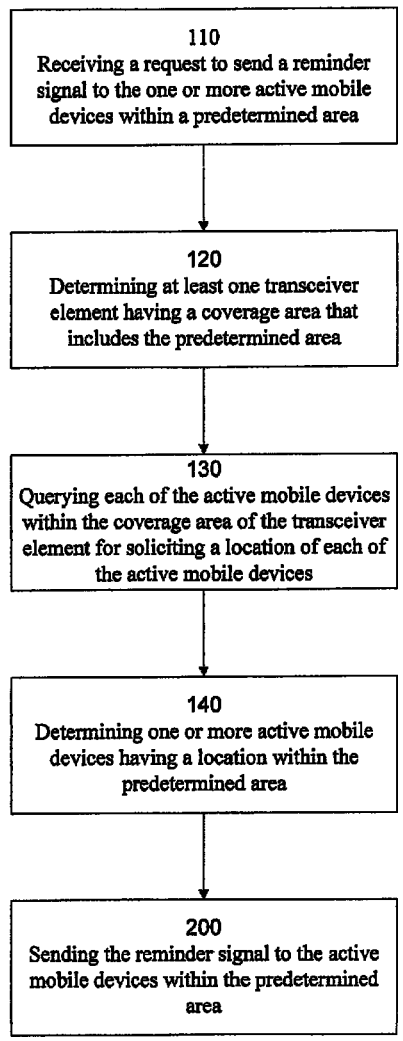
FIG. 3 illustrates a flow chart of a method according to another embodiment.

Another embodiment of a system and method for sending reminders to one or more mobile devices within a predetermined area is set forth in FIG. 3 with reliance upon information provided by and transmitted via a network such as that described above and depicted in FIG. 2. According to the embodiment illustrated in FIG. 3, the identification of the mobile devices within a predetermined area through the wireless communication network may include the wireless communication network initially receiving a request to send a reminder signal to the mobile devices within the predetermined area 110. The request may come directly from a mobile device within the wireless communication network or indirectly though another wireless or wired communication network. In the example of a movie theater complex described above, the request may originate with the theater owner or manager.

The request may be in the form of a telephone call to a receiving element of the wireless communication network having a predetermined access number. The operator of the wireless communication network may have established one or more predetermined access numbers to correspond to one or more predetermined areas within the coverage of the wireless communication network, such that the wireless communication network responds to a telephone call to a predetermined access number as a request to send a reminder signal to the mobile devices within a predetermined area associated with the access number. In another embodiment, the request may provide the boundaries and location of the predetermined area and/or a time for sending the reminder signal. Or the request may include the identity of the mobile devices within the predetermined area.

Identifying the mobile devices within a predetermined area in this embodiment may include determining the switching element that covers the predetermined area. The wireless communication network may store the corresponding switching element for one or more predetermined areas, such that in response to a request, the wireless network system may route the request or send instructions to the appropriate switching element depending on the predetermined area. In some embodiments, the switching element covering the predetermined area may directly receive the request. For example, the request may originate from a mobile device within or near the predetermined area and thus the request may be routed from the mobile device to a transceiver element and to the switching element covering the predetermined area.

According to the embodiment illustrated in FIG. 3, identifying the mobile devices within a predetermined area may further include determining the at least one transceiver element that covers the predetermined area 120. The wireless communication network may store the corresponding transceiver element for one or more predetermined areas, such that in response to a request, the switching element may send instructions to the appropriate transceiver element depending on the predetermined area. The request may originate from a mobile device within or near the predetermined area and thus the request may be routed through the transceiver element covering the predetermined area to the switching element.

The wireless communication network can determine the switching element that covers the predetermined area and identify the active mobile devices within the coverage of that switching element through the information stored within the associated VLR. Moreover, the wireless communication network can further determine the particular transceiver element or transceiver elements that cover that predetermined area and identify the active mobile devices within the coverage of that transceiver element or elements through the LAI stored within the VLR.

The wireless communication network may also determine which of the mobile devices within coverage area of the transceiver element are also within the predetermined area by querying the mobile devices 130, 140. For example, each mobile device may include a locating sensor that is configured to receive locating coordinates through a Global Positioning Satellites ("GPS") network. In such embodiments, the wireless communication network may send a query to each mobile device within the coverage of the transceiver element that services the predetermined area to send its current location and based on the responses from each mobile device, the wireless communication network can determine which mobile devices are within the predetermined area. As another example, the wireless communication system may determine which of the mobile devices are within the predetermined area through the use of time differences of arrival ("TDOA") and/or angle of arrival ("AOA") techniques. TDOA is the calculation of the mobile device's location based on the speed at which the signals from the mobile device reach a plurality of transceiver elements. AOA is the calculation of the mobile device's location based on the directions of the signals received from two or more transceiver elements from the mobile device.

Figure 4:
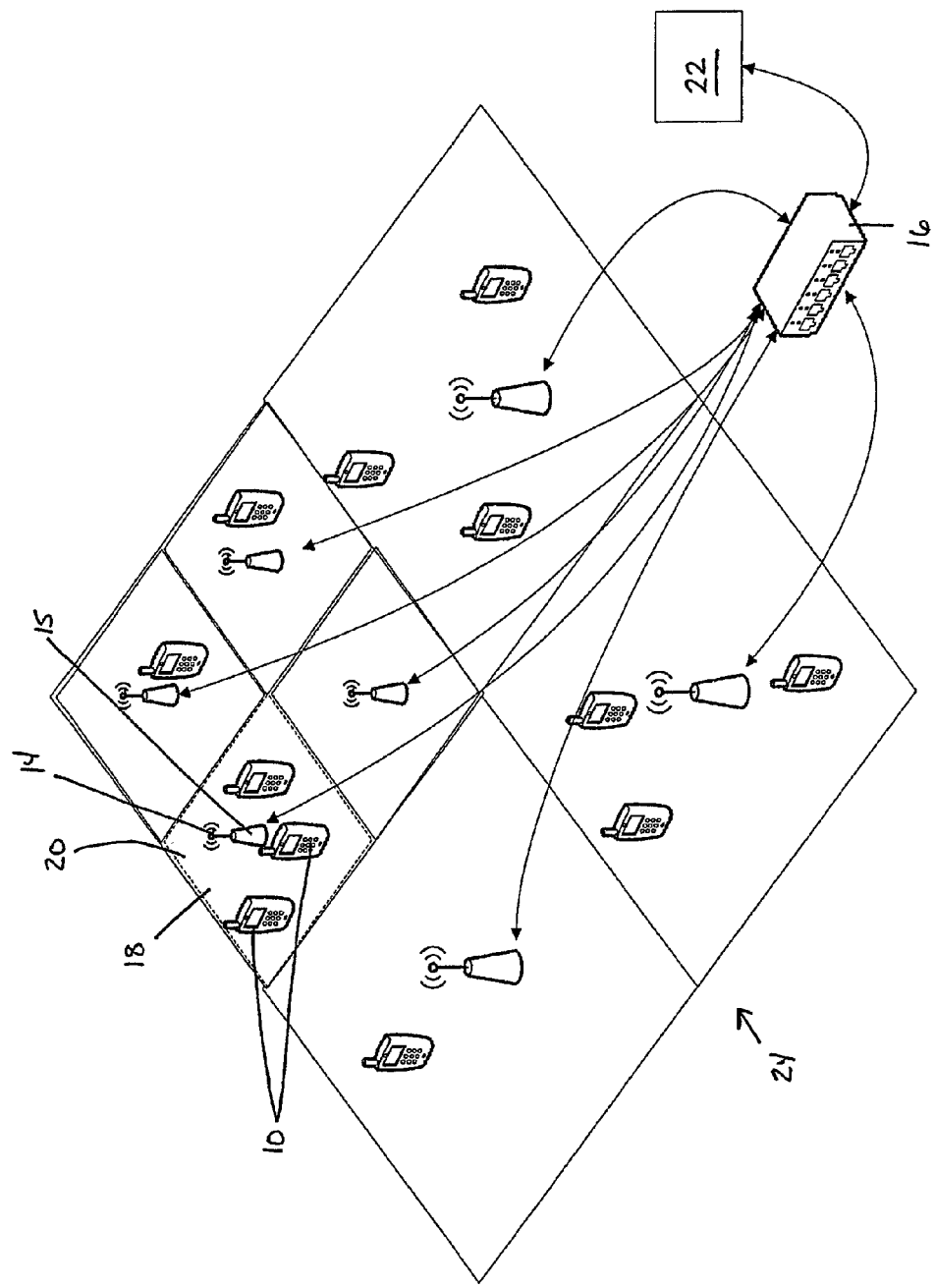
FIG. 4 illustrates a block diagram of a wireless communication network according to yet another embodiment.

According to other embodiments of the present invention and as illustrated in FIG. 4, the coverage area 18 of a transceiver element or collective coverage area of multiple transceiver elements may be configured to correspond to the predetermined area 20, i.e., the coverage area may have substantially the same boundaries as the predetermined area. As an example, the predetermined area may be a movie theater complex and a transceiver element may be located and/or configured such that the coverage area of the transceiver element corresponds to the movie theater complex. Therefore, the wireless communication system may not need to determine the location of each mobile device within the coverage area of the transceiver element because the coverage area corresponds to the predetermined area.

According to some embodiments, once the active mobile devices located within the predetermined area are identify, the wireless communication network may send a reminder signal to each of the active mobile devices. The reminder signal may be timed according to planned event at the predetermined area. Again as an example, the predetermined area may be a movie theater complex and the reminder signal may be sent 10 minutes before the planned start of a movie at the movie theater complex.

Other embodiments may include the use of a plurality of wireless communication networks. For example, if the mobile devices within the predetermined area operate within a plurality of wireless communication networks then embodiments of the system and method may include sending requests to the plurality of wireless communication networks and sending reminder signals via the plurality of wireless communication networks to the mobile devices of the plurality of wireless communication networks within a predetermined area.

Although the signal sent to the mobile devices within the predetermined area has been generally described as a reminder signal, in other embodiments the signal may include additional information in addition to or instead of a reminder. For example, the signal may include general information or instructions about one or more events associated within the predetermined area.

Embodiments described above generally described the wireless communication network performing operations to determine the identity of the mobile devices within a predetermined area and sending reminder signals to the identified mobile devices. It is understood that operations attributed to the wireless communication network may be more specifically performed by particular hardware elements and/or software elements of the wireless communication network. For example, one or more controller elements, such a processor, controller, or other computing device, and storage elements of the wireless communication network may embody or otherwise be in communication with a computer program product which includes a computer-readable storage medium and one or more computer programs or instructions (i.e. software) for performing one or more of the operations relating to embodiments of the present invention, including each block of the block diagrams and flowchart illustrations disclosed herein. At least one of the storage elements may include stored information for one or more predetermined areas, such as the boundaries of the predetermined areas relative to one or more of the transceiver elements. It is understood that the controller element(s) and the storage element(s) are configured to be in communication with the corresponding transceiver element and/or switching element for the predetermined areas. It is also understood that one or more of the controller element(s) and the storage element(s) may be co-located with a transceiver element or a switching element. Or that a controller element co-located with a first transceiver element or a first switching element may send instructions to a second transceiver element or a second switching element through the wireless communication network and/or through a second communication network.

Figure 5:
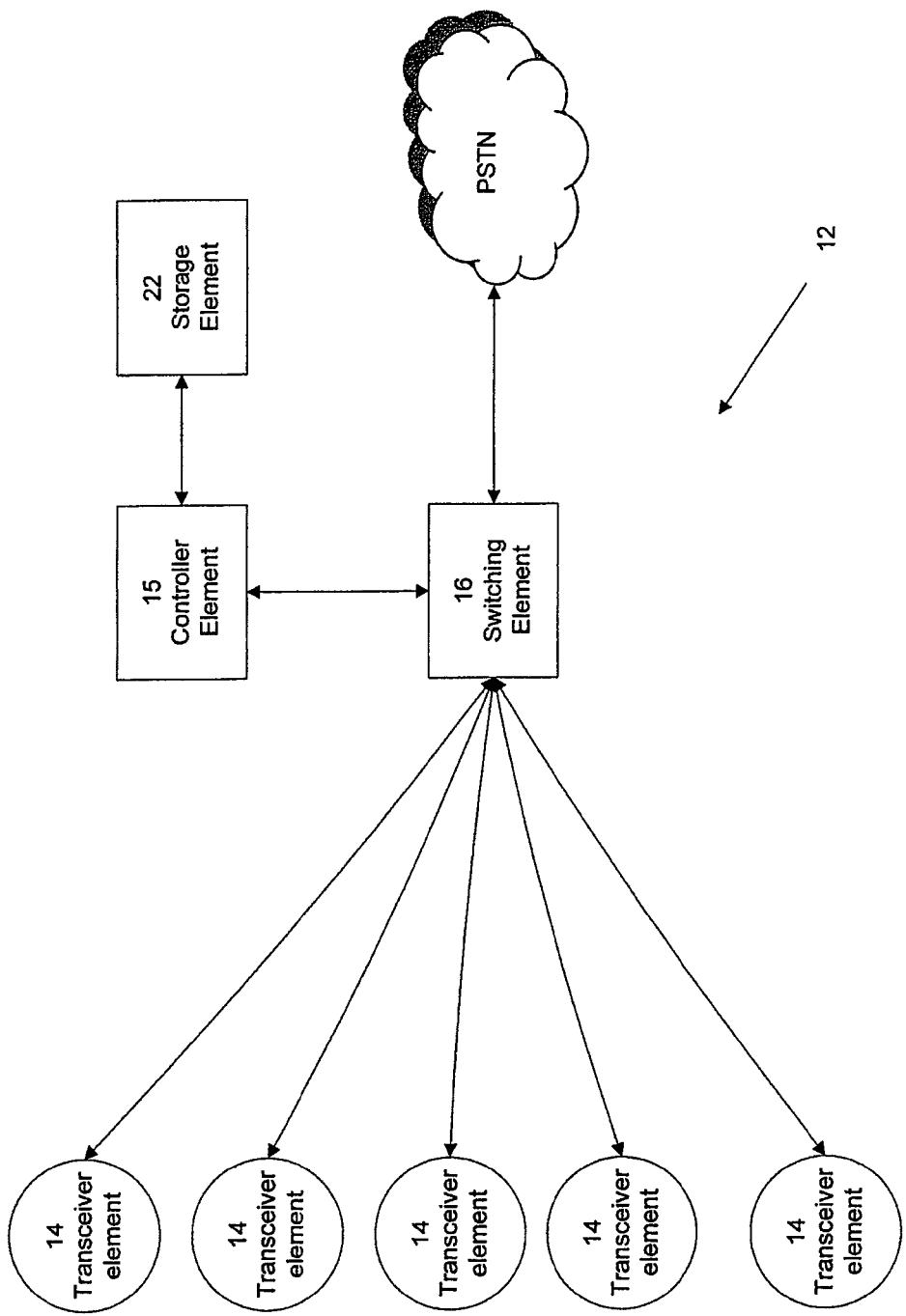
FIG. 5 illustrates a block diagram of a system according to yet another embodiment.

As a more specific example, an embodiment as illustrated in FIG. 5 may include a system 12 comprising a plurality of transceiver elements 14, at least one storage element 22, a controller element 15, and at least one switching element 16. Each transceiver element 14 may define a coverage area, wherein each transceiver element 14 is configured to send and receive one or more signals to and from one or more mobile devices within the coverage area of the transceiver element 14. The storage element 22 may identify the one or more mobile devices for each transceiver element 14. For example and as discussed above, the storage element 22 may include a VLR and LAI pertaining to the mobile devices. The controller element 15 may receive the request to send a reminder signal to the mobile devices within a predetermined area. The request may be routed to the controller element 15 through one of the transceiver elements 14 or through other receiving elements of the system or through a second communications system, such as the PSTN or a wide area network such as the Internet.

The controller element 15 may also identify at least one transceiver element 14 that defines a coverage area that includes the predetermined area and send instructions to the transceiver element 14 to send a reminder signal to the one or more mobile devices within the predetermined area. For example, the controller element 15 may identify the at least one transceiver element 14 by the accessing the information stored within the storage element 22. The controller element 15 may further instruct the transceiver element 14 to send a preliminarily query signal to the one or more mobile devices within the coverage area of the transceiver element 14 to solicit a location for each of the one or more mobile devices within the coverage area of the transceiver element 14. The preliminarily query signal may be configured to receive a response from the mobile devices but not to activate the ringer element of the mobile devices. Each mobile device may respond to the query signal by providing the location of the mobile device. For example, as discussed above, the mobile device may include a locating sensor. Or the controller element 15 may determine the location of each of the mobile devices by the angle or time in which the response signal is received by at least two transceiver elements 14.

Sending reminder signals to active mobile devices within a predetermined area may help to reduce disruptions during an event from mobile devices. In particular, the reminder signal may help remind the patrons of the event to change the ring setting on their mobile devices to non-audio indicators. Moreover, sending a reminder signal does not substantially interfere with the operability of the mobile devices and thus emergency or other important signals may still get through to the patrons during the event without disrupting the event.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A method comprising:
   receiving a request identifying a predetermined area in which to send a ring setting reminder signal, the request containing one or more parameters associated with the predetermined area;
   identifying one or more mobile devices within the predetermined area by querying each of the one or more mobile devices and receiving responses associated with the location of such mobile device;
   transmitting the ring setting reminder signal to the one or more mobile devices within the predetermined area, wherein the ring setting reminder signal is associated with a ring setting of the respective mobile device.

2. The method of claim 1, wherein the ring setting reminder signal includes a message describing the purpose of the signal.

3. The method of claim 2, wherein the message includes instructions to turn the ring setting to a non-audio setting.

4. The method of claim 1, further comprising:
   determining at least one transceiver element for a wireless communication network having a coverage area that includes the predetermined area, the at least one transceiver element being associated with a plurality of mobile devices operating on the wireless communication network and using the at least one transceiver element;
   wherein transmitting the ring setting reminder signal includes using the at least one transceiver element to send the ring setting reminder signal.

5. A method comprising:
   receiving a request to send a ring setting reminder signal to one or more mobile devices within a predetermined area, wherein the request identifies the predetermined area;
   determining at least one transceiver element for a wireless communication network having a coverage area that includes the predetermined area, the at least one transceiver element being associated with a plurality of active mobile devices operating on the wireless communication network and using the at least one transceiver element;
   identifying one or more mobile devices that are active within the predetermined area by instructing the at least one transceiver element to send a query signal to each of the plurality of active mobile devices within the coverage area and receive responses associated with the location of each respective active mobile device; and
   transmitting a signal to the one or more mobile devices within the predetermined area such that the signal activates a ringer element of each of the one or more mobile devices based on a current setting for the ringer element.

6. The method of claim 5, wherein the signal further comprises a message describing the purpose of the signal.

7. The method of claim 6, wherein the message comprises instructions to turn the ringer element to a non-audio setting.

8. The method of claim 5, wherein identifying comprises:
   receiving a number associated with each of the one or more mobile devices.

9. The method of claim 8, wherein the number is received prior to entry of each of the one or more mobile devices into the predetermined area.

10. The method of claim 5, wherein identifying comprises:
    detecting an electronic surveillance device associated with each of the one or more mobile devices upon entry into the predetermined area.

11. The method of claim 5, further comprising:
    creating a database of information about each of the plurality of active mobile devices; and
    updating the database as active mobile devices enter and leave the coverage area.

12. The method of claim 11, wherein the database comprises information identifying a particular transceiver element in communication with each of the plurality of active mobile devices.

13. The method of claim 5, further comprising:
    receiving a request to transmit the signal to the one or more active mobile devices within the identified predetermined area.

14. The method of claim 5, wherein the transmission of the signal precedes an event in the predetermined area.

15. A non-transitory computer readable medium comprising code to perform the steps of the method of claim 1.

16. A system comprising:
    at least one controller element configured to:
      receive a request to send a ring setting reminder signal to one or more mobile devices within a predetermined area, wherein the request identifies the predetermined area;
      identify one or more of the active mobile devices within the predetermined area by instructing a transceiver element, that has a coverage area that includes the predetermined area, to send a query signal to each of the plurality of active mobile devices within the coverage area and receive responses associated with the location of each respective active mobile device, and
      transmit a signal to the one or more active mobile devices within the predetermined area such that the signal activates a ringer element of each of the one or more mobile devices based on a current setting for the ringer element.

17. The system of claim 16, further comprising:
    at least one storage element comprising a database of information about each of the one or more active mobile devices wherein the database is continuously updated as active mobile devices enter and leave the predetermined area.

18. The system of claim 17, wherein the database comprises information identifying a particular transceiver element in communication with each of the plurality of active mobile devices.

* * * * *